United States Patent
Liu

(10) Patent No.: US 9,027,096 B2
(45) Date of Patent: May 5, 2015

(54) METHOD AND DEVICE FOR ENHANCING SECURITY OF USER SECURITY MODEL

(75) Inventor: Taiqiang Liu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 282 days.

(21) Appl. No.: 13/519,174

(22) PCT Filed: Nov. 3, 2010

(86) PCT No.: PCT/CN2010/078371
§ 371 (c)(1),
(2), (4) Date: Jun. 26, 2012

(87) PCT Pub. No.: WO2011/088698
PCT Pub. Date: Jul. 28, 2011

(65) Prior Publication Data
US 2012/0272303 A1    Oct. 25, 2012

(30) Foreign Application Priority Data

Jan. 20, 2010 (CN) .......................... 2010 1 0000918

(51) Int. Cl.
*G06F 7/04* (2006.01)
*G06F 15/16* (2006.01)
(Continued)

(52) U.S. Cl.
CPC ................ *H04L 63/083* (2013.01); *H04L 9/32* (2013.01); *H04L 12/2403* (2013.01); *H04L 12/24* (2013.01);
(Continued)

(58) Field of Classification Search
CPC ....... H04L 12/24; H04L 12/2403; H04L 9/32; H04L 9/3226; H04L 41/0213; H04L 63/08; H04L 63/083; G06F 21/00
USPC ........................................................ 726/1, 6
See application file for complete search history.

(56) References Cited

U.S. PATENT DOCUMENTS 5,996,076 A * 11/1999 Rowney et al. ............... 713/156
7,290,142 B1 * 10/2007 Yost ............................. 713/171
(Continued)

FOREIGN PATENT DOCUMENTS

| CN | 1477499 A | 2/2004 |
| CN | 101430842 A | 5/2009 |

(Continued)

OTHER PUBLICATIONS

Zhao Ji, et al., An Optimal Algorithm to Find Seeds in Strings, Aug. 2005, pp. 6-13, vol. 18, China Academic Journal Electronic Publishing House.

(Continued)

*Primary Examiner* — Jeffrey Pwu
*Assistant Examiner* — Jayesh Jhaveri
(74) *Attorney, Agent, or Firm* — Maier & Maier, PLLC

(57) ABSTRACT

The disclosure discloses a method and system for enhancing the security of a user security model. In the solution of the disclosure, after a Simple Network Managing Protocol (SNMP) server acquires a multi-byte original password of a user, detects whether the original password is composed of a specific byte string repeated multiple times; and if so, the user is prompted to reconfigure a password. In accordance with the solution provided by the disclosure, the disclosure greatly enhances the security of version V3 for the SNMP server side, solves the problem that the vulnerability exists in the security defined in version V3 in the prior art, and avoids the security hidden danger caused by the fact that illegal users can use the password different from the password of the authorized user to log on the SNMP server.

10 Claims, 2 Drawing Sheets

(51) Int. Cl.
    *G06F 17/30*     (2006.01)
    *H04L 29/06*     (2006.01)
    *G06F 21/46*     (2013.01)
    *H04L 9/32*     (2006.01)
    *H04L 12/24*     (2006.01)

(52) U.S. Cl.
    CPC ............... *H04L 63/08* (2013.01); *H04L 9/3226* (2013.01); *G06F 21/46* (2013.01); *H04L 41/0213* (2013.01); *H04L 41/28* (2013.01)

(56) References Cited

U.S. PATENT DOCUMENTS

| | | | | |
|---|---|---|---|---|
| 7,571,239 | B2* | 8/2009 | Goringe et al. | 709/229 |
| 8,276,196 | B1* | 9/2012 | Shipley | 726/6 |
| 2006/0037064 | A1 | 2/2006 | Jeffries | |
| 2006/0087407 | A1* | 4/2006 | Stewart et al. | 340/10.52 |
| 2007/0157299 | A1* | 7/2007 | Hare | 726/9 |
| 2008/0133933 | A1* | 6/2008 | Bender | 713/186 |
| 2008/0240428 | A1 | 10/2008 | Hobbet et al. | |
| 2009/0144554 | A1* | 6/2009 | Baker | 713/183 |

FOREIGN PATENT DOCUMENTS

| | | |
|---|---|---|
| CN | 101350048 A | 1/2010 |
| CN | 101795268 A | 8/2010 |

OTHER PUBLICATIONS

International Search Report in International Application No. PCT/CN2010/078371, mailed on Feb. 17, 2011.
English Translation of the Written Opinion of the International Search Authority in International Application No. PCT/CN2010/078371, mailed on Feb. 17, 2011.
Operational Security Requirements for IP Network Infrastructure draft—jones—opsec—01 Aug. 13, 2003.
User-based Security Model (USM) for version 3 of the Simple Network Management Protocol (SNMPv3) Apr. 1, 1999.
Supplementary European Search Report in European application No. 10843738.5, mailed on Dec. 10, 2014.

* cited by examiner

US 9,027,096 B2

METHOD AND DEVICE FOR ENHANCING SECURITY OF USER SECURITY MODEL

RELATED APPLICATIONS

This is the U.S. national stage application which claims priority under 35 U.S.C. § 371 to International Patent Application No. PCT/CN2010/078371, filed on Nov. 3, 2010, which claims priority to Chinese Patent Application No. 201010000918.8, filed Jan. 20, 2010, the disclosures of which are incorporated by reference herein their entireties.

TECHNICAL FIELD

The disclosure relates to a communication technology, in particular to a method and a device for enhancing the security of a user security model.

BACKGROUND

Authority management of the system management is very important work; and a series of authorization and authentication measures are adopted by various management interfaces and management tools to avoid login of illegal users. At present, Simple Network Management Protocol (SNMP) which has three versions as follows: V1, V2c and V3, has become a widely applied network management protocol;

the version V1 and the version V2c are not defined well in terms of security; the version V3 has enhanced the definition of security, such as user management and data encryption, but the security defined by the version V3 is not very perfect since the situation that an unauthorized user logs on may occur in the user password encryption part in the User-Based Security Model (USM) which is defined by the version V3.

The USM is defined in RFC2574 of the SNMP V3 version; wherein a method for encrypting the password of the SNMP user by using encryption algorithm Message-Digest Algorithm 5 (MD5) or encryption algorithm Secure Hash Algorithm (SHA) is defined. The method has a problem that different original passwords may be the same after encryption; that is to say, an illegal user can use the password different from the password of the authorized user to log on the SNMP server which is configured to realize RFC2574.

That is because the way for encrypting the SNMP user password in the RFC2574 is to expand the original password of the user; and the expand method is to repeat the original password for several times until the length of 1048576 bytes is reached. For example, if the original password is 'ab', the total length of the password can reach to 1048576 bytes after the ab is repeated for 1048576/2-1 times; and then the encrypted password is obtained after the password in the length of 1048576 bytes is subjected to the series of MD5 or SHA encryption process. The condition that two different original passwords may become same after being expanded to the length of 1048576 bytes is existed in such method, so the security cannot be guaranteed no matter how to encrypt subsequently. For another example, the original password 'aaaa' of the user A and another original password a after being expanded both form 1048576 a, so no matter the encryption is processed by using either MD5 or SHA, the encrypted results are necessarily same as long as the encrypted data are same. Consequently, if an illegal user AA who knows the user name of the user A at this moment and tries to use the password a to log on through SNMP client, may passes through the verification and uses the unauthorized password to access in the system illegally through the SNMP management interface as the SNMP server side verifies the user strictly according to the user password encryption method of the RFC2574.

Generally speaking, users consider that the longer the password is, the safer it is, so most SNMP servers only make a limitation that the password configured by a user must reach to certain length or the password mixed with letters and digits is used so as to enhance the security. Such vulnerability exists in the USM defined by the SNMP V3 in the RFC2574. As a result, an illegal user may use short byte string as a password to log on the SNMP server if the password although long and complex is composed by repeating one shorter byte string for twice or more.

SUMMARY

In view of the above problems, the disclosure provides a method and a device for enhancing the security of a user safety model to solve the problem that the security is affected by the vulnerability which exists in the user security model defined in the RFC2574 by the SNMP V3 in the prior art.

In order to solve the technical problem, the following solutions are provided.

A method for enhancing the security of a user safety model is provided, which includes that: after a SNMP server acquires a multi-byte original password of a user, the SNMP server detects whether the multi-byte original password is composed of a specific byte string repeated multiple times; and if so, the user is prompted to reconfigure a password.

When the SNMP server acquires a single-byte original password of the user, the SNMP server determines that the original password is failed in verification and prompts the user to reconfigure a password.

The SNMP server acquires the multi-byte original password of the user comprises that: the SNMP server acquires the original password of the user through a configuration management interface, wherein the original password is configured in the SNMP server.

After detecting whether the original password is composed of a specific byte string repeated multiple times, if the original password is not composed of a specific byte string repeated multiple times, the original password is transmitted to a USM module, and a USM module completes password encryption of the user and user authority management based on the original password.

Detecting whether the original password is composed of a specific byte string repeated multiple times comprises that: the SNMP server detects whether the first byte to content of the password appears repeatedly in the original password byte string; if so, and the original password is acquired by repeating a substring formed with bytes preceding a byte with reappeared first byte content one or multiple times, the original password is determined to be composed of a specific byte string repeated multiple times; otherwise, the original password is determined to be not composed of a specific byte string repeated multiple times.

A SNMP server includes a USM module, and further includes a password acquiring module and a password detection module. The password acquiring module is configured to acquire an original password of a user. The password detection module is configured to detect whether the original password acquired by the password acquiring module is composed of a specific byte string repeated multiple times and if so, prompt the user to reconfigure a password.

The password detection module is further configured to determine that the original password is failed in verification when the password acquiring module acquires a single-byte original password of the user and prompt the user to reconfigure a password.

The password acquiring module acquires the original password of the user through a configuration management interface, and the original password of the user is configured in the SNMP server.

The password detection module is further configured to transmit the original password to the USM module when the original password is not composed of a specific byte string repeated multiple times; and the USM module is configured to complete password encryption of the user and user authority management based on the received original password.

The password detection module is configured to detect whether a first byte content of the password appears repeatedly in the original password byte string; if so, and the original password is obtained by repeating a substring formed with bytes preceding a byte with the reappeared first byte content one or multiple times, determine that the original password is composed of a specific byte string repeated multiple times; otherwise, determine that the original password is not composed of a specific byte string repeated multiple times.

The disclosure has the following beneficial effects:

Compared with the solutions in the prior art, the method and the device provided by to the disclosure greatly enhances the security of version V3 for the SNMP server side, solves the problem that the vulnerability exists in the security defined in version V3 in the prior art, and avoids the security hidden danger caused by the fact that illegal users can use the password different from the password of the authorized user to log on the SNMP server.

BRIEF DESCRIPTION OF THE DRAWINGS

In order to illustrate the embodiment of the disclosure or the technical solution in the prior art, a brief introduction below is made for the accompanying drawings that are needed to describe the embodiment or the prior art. Obviously, the accompanying drawings described below are only some embodiments of the disclosure; as far as the normal technicians in this field are considered, other accompanying drawings can be obtained according to the accompanying drawings without giving creative operations.

DETAILED DESCRIPTION

The technical solution in the embodiment of the disclosure is to be described clearly and completely below with reference to the accompanying drawings in the embodiments of the disclosure. Obviously, the described embodiments are only a part of the embodiments of the disclosure rather than all the embodiments. Based on the embodiment in the disclosure, other embodiments may be obtained by a person skilled in the art without giving creative operations belong to the scope of protection of the disclosure.

In order to solve the problem that there is vulnerability in the USM, which is defined in the RF2574 of the SNMP V3 version in the prior art, that SNMP server can be logged on by using a password different from the password of the authorized user, the disclosure provides a method and a device for enhancing the security of a user security model.

Figure 1:
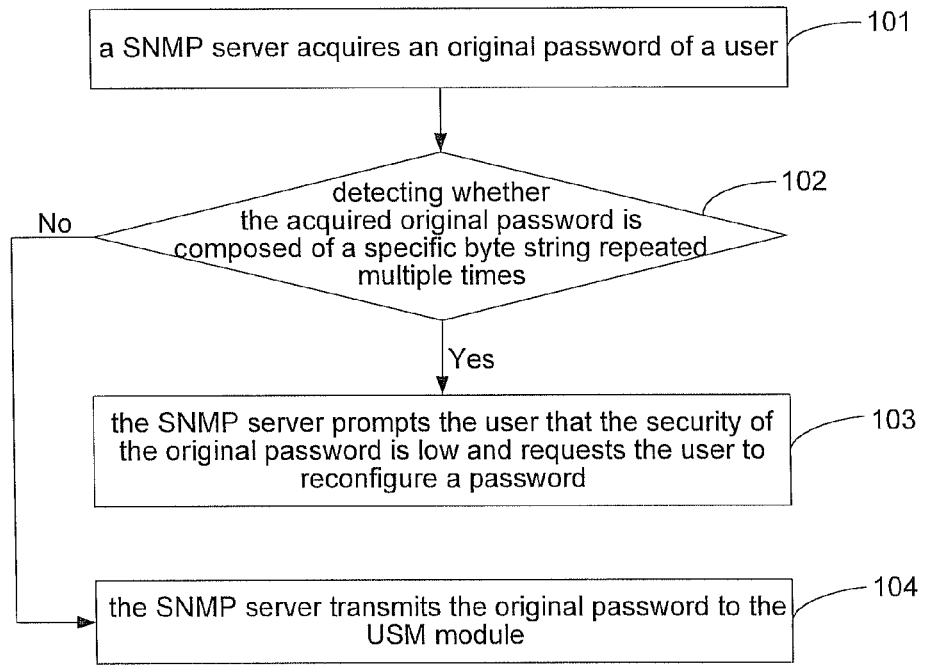
FIG. 1 is a flowchart of a method for enhancing the security of a user security model provided by the disclosure.

As shown in the FIG. 1, the flowchart of a method for enhancing the security of a user security model provided by the disclosure includes the following steps:

Step 101, the SNMP server acquires the original password of the user.

Step 102, the SNMP server detects whether the acquired original password is composed of a specific byte string repeated multiple times; if so, performing Step 103; otherwise, performing Step 104.

In step 102, the specific implementation way for the SNMP server to detect whether the acquired original password is composed of a specific byte string repeated multiple times is as follows:

the SNMP server detects whether the first byte content of the password appears repeatedly in the acquired original password byte string of the user; if so, and the original password is obtained by repeating a substring formed with bytes preceding a byte with the reappeared first byte content one or multiple times, then determines that the original password is composed of a specific byte string repeated multiple times; otherwise, determines that the original password is not composed of a specific byte string repeated multiple times.

It should be noted that in the system of the USM, which is defined by the RFC2574 and applied by the SNMP server, a security detection mechanism for detecting the byte length of the original password input by a user generally exists. The single-byte password is generally given a security prompt of not being applied due to low security. Therefore, when the SNMP server acquires the original password of the user, the original password is generally a multi-byte password. However, when there is no above-mentioned security detection mechanism in the system, the SNMP server further needs to detect the length of the acquired original password; and when the user password is a single-byte password, the Step 103 is performed.

Step 103, the SNMP server prompts the user that the security of the original password is low and requests the user to reconfigure a password.

Step 104, the SNMP server transmits the original password to a USM module; and the USM module, after receiving the original password, completes the password encryption of the user and the user authorization management based on the original password.

Figure 2:
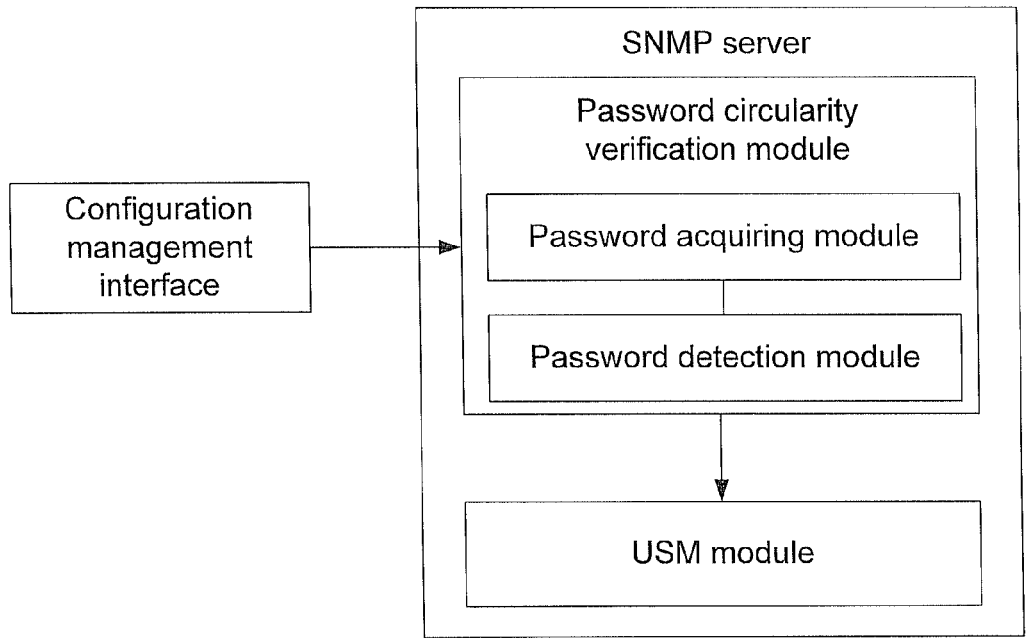
FIG. 2 illustrates a structural diagram of a system of user security model of RFC2574 in the embodiment of the disclosure.

A preferred embodiment of the disclosure below is given according to the FIG. 2 to the FIG. 4; and by combining with the description of the embodiment, the technical details of the disclosure is further provided to illustrate the specific implementation process of the method and the device provided by the disclosure better.

In order to increase the security of the USM defined by the SNMP RFC2574, the technical solution adopted by the embodiment of the disclosure is to add module for is password circularity verification to the SNMP server realized in the system of the USM defined by the RFC2574. The structural diagram of the system is as shown in the FIG. 2; the system includes a SNMP server and a configuration management interface. The SNMP server includes a password circularity verification module and a USM module. The password circularity verification module includes a password acquiring module and a password detection module.

The SNMP server is the server side for realizing the SNMP and receiving the access of the SNMP client. The configuration management interface is a tool or interface for configuring the SNMP server. The relevant configuration data of the SNMP, such as user information and in most cases, the command line interface, can be changed through the configuration management interface; for example, the original password zxr10zxr10zxr10 of user1 is added by using the command line; and the original password of the user is encrypted by using the encryption algorithm MD5.

After the administrator configures the SNMP user through the configuration management interface, the password circularity verification module of the SNMP server verifies the original password of the user after obtaining the configured SNMP V3 user data from the configuration management interface. The verification basis is as follows: if the user appoints password encryption manner, after the original password is expanded to 1048576 bytes according to the method in the RFC2574, and If the condition that another original password different from the original password has the same result after expanded to 1048576 bytes is existed, low security of the password is prompted to the user according to safety strategy, and the user is requested to reconfigure a password. The user information passed the verification of the password circularity verification module is sent to the USM module. The USM module completes the original password encryption of the user and the user authorization management according to the requirements of the RFC2574.

The password acquiring module in the password circularity verification module is configured to obtain the original password of the user. The password detection module is configured to detect whether the original password obtained by the password acquiring module is composed of a specific byte string repeated multiple times, if so, prompting the user to reconfigure a password, otherwise, transmitting the original password to the USM module.

The specific way of detecting whether the original password obtained by the password acquiring module is composed of a specific byte string repeated multiple times is as follows:

the password detection module detects whether the first byte content of the password appears repeatedly in the obtained original password byte string of the user; if so, and the original password is obtained by repeating a substring formed with bytes preceding a byte with the reappeared first byte content one or multiple times, determines that the original password is composed of a specific byte string repeated multiple times; otherwise, determines that the original password is not composed of a specific byte string repeated multiple times.

When the original password is determined to be composed of a specific byte string repeated multiple times, it indicates that the security of the original password is low. Taking the original password zxr10zxr10zxr10 of user1 as an example, when the z is repeated for the first time, the obtained substring is zxr10. Obviously, after repeat the zxr10 several times, the original password is obtained. So it proves that the password has the security hidden danger pointed out by the disclosure without further determination.

Figure 3:
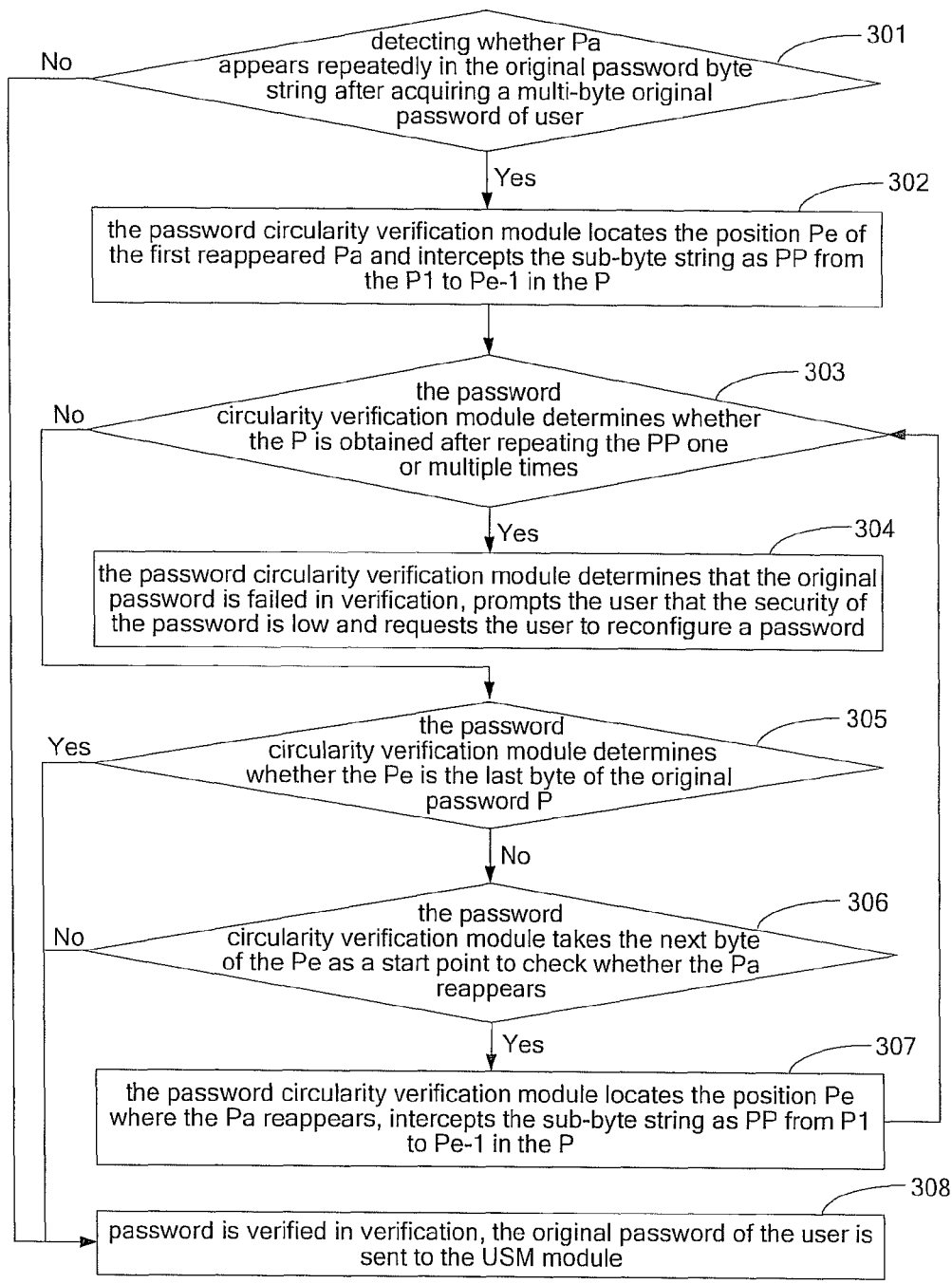
FIG. 3 illustrates a flow diagram of password verification performed by a password circularity verification module in the embodiment of the disclosure.

The specific verification process below is described in detail; and as shown in the FIG. 3, the following steps are included.

In the verification process, assuming that the original password is P, the position of the first byte of the P is P1, and the corresponding content at the P1 is Pa.

Step 301, The password circularity verification module detects if the Pa appears repeatedly in the original password byte string after obtaining the multi-byte original password of user; if so, the Step 302 is performed; otherwise, the Step 308 is performed.

Step 302, the password circularity verification module locates the position Pe of the first reappeared Pa and intercepts the substring as PP from the P1 to Pe−1 in the P.

Step 303, the password circularity verification module determines whether the P is obtained after repeating the PP one or multiple times; if so, the Step 304 is performed; otherwise, the Step 305 is performed.

Step 304, the password circularity verification module determines that the original password is failed in verification, prompts the user that the password security is low, and requests the user to reconfigure a password, and the current process is ended.

Step 305, the password circularity verification module determines whether the Pe is is the last byte of the original password P; if so, the Step 308 is performed; otherwise, the Step 306 is performed.

Step 306, the password circularity verification module takes the next byte of the Pe as a start point to check whether the Pa reappears; if so, the Step 307 is performed; otherwise, the Step 308 is performed.

Step 307, the password circularity verification module locates the position Pe where Pa reappears, intercepts the substring as PP from P1 to Pe−1 in the P and performs the Step 303.

Step 308, password is verified in verification, the original password of the user is sent to the USM module.

In order to describe the disclosure more clearly, the specific implementation process of the disclosure is illustrated below by taking the verification process of the original password P=ababcababc as an example.

First, succeeding in verification as the length of the P is greater than 1.

Then, searching for the character 'a' from position Ps=2 in the P. When the character a is located at position Pe=3, and PP=ab is intercepted but the P cannot be obtained by repeating the PP multiple times, continuing to search for the character a after updating Ps=4; when the character a is located at position Pe=6, the PP=ababc is intercepted, and the P is obtained after repeating the PP two times, then determining that the verification is failed, that is to say, the password has the security hidden danger pointed out by the disclosure.

The method and the device provided by the disclosure solve the problem that the vulnerability exists in the security defined in version V3 in the prior art, avoid the security hidden danger caused by the fact that illegal users can use the password different from the password of the authorized user to log on the SNMP server, and enhance the security of the version V3 for the SNMP server side.

Obviously, a person skilled in the art can change and modify the disclosure without departing from the scope of the disclosure. Thus, if the modifications and deformations of the disclosure belong to the scope of the appended claims and equivalent technologies of the disclosure, the disclosure intends to include the modifications and the deformations.

The invention claimed is:

1. A method for enhancing security of a user security model, comprising:
  detecting, by execution on a processor, of software instructions stored in a memory of a Simple Network Managing Protocol Version 3 (SNMP V3) server, whether a multi-byte original password is composed of a specific byte string repeated multiple times, after the SNMP V3 server obtains the multi-byte original password of a user; and
  prompting the user to reconfigure a password when the multi-byte original password is composed of a specific byte string repeated multiple times, wherein the detecting whether the original password is composed of a specific byte string repeated multiple times comprises:

detecting, by the SNMP V3 server, whether a first byte content of the password appears repeatedly in the original password byte string;

if so, detecting, by the SNMP V3 server, whether the original password is comprised of only the repeating of one substring formed by content of the first byte with bytes preceding the firstly reappeared first byte content one or multiple times, if so, determining that the original password is composed of a specific byte string repeated multiple times;

otherwise, determining that the original password is not composed of a specific byte string repeated multiple times.

2. The method according to claim 1, further comprising:

determining, by the SNMP V3 server, that a single-byte original password is failed in verification and prompting the user to reconfigure a password, when the SNMP V3 server obtains the single-byte original password of the user.

3. The method according to claim 1, wherein the SNMP V3 server obtaining the multi-byte original password of a user comprises:

obtaining, by the SNMP V3 server, the multi-byte original password of the user through a configuration management interface, wherein the original password is configured in the SNMP V3 server.

4. The method according to claim 1, further comprising the step, performed after the detecting whether a multi-byte original password is composed of a specific byte string repeated multiple times, of: receiving, by a User-Based Security Model (USM) module, the original password and completing user password encryption and user authorization management based on the original password, when the original password is not composed of a specific byte string repeated multiple times.

5. A Simple Network Managing Protocol Version 3 (SNMP V3) server comprising a User-Based Security Model (USM) module, further comprising:

a password acquiring module configured to acquire an original password of a user; and a password detection module configured to detect whether the original password obtained by the password acquiring module is composed of a specific byte string repeated multiple times, and prompt the user to reconfigure a password if the original password is composed of a specific byte string repeated multiple times, wherein the password detection module is configured to:

detect whether a first byte content of the password appears repeatedly in the original password byte string;

if so, detect whether the original password is comprised of only the repeating of one substring formed by content of the first byte with bytes preceding the firstly reappeared first byte content one or multiple times, if so, determine that the original password is composed of a specific byte string repeated multiple times;

otherwise, determine that the original password is not composed of a specific byte string repeated multiple times;

wherein the USM module, the password acquiring module, and the password detection module are each the result of execution on a processor of software stored in a memory of the SNMP V3 server.

6. The SNMP V3 server according to claim 5, wherein the password detection module is further configured to determine that the original password is failed in verification and prompt the user to reconfigure a password, when the password acquiring module acquires a single-byte original password of the user.

7. The SNMP V3 server according to claim 5, wherein the password acquiring module acquires the original password of the user through a configuration management interface; and the original password of the user is configured in the SNMP V3 server.

8. The SNMP V3 server according to claim 5, wherein the password detection module is further configured to transmit the original password to the USM module when the original password is not composed of a specific byte string repeated multiple times; and the USM module is configured to complete password encryption of the user and user authority management based on the received original password.

9. The method according to claim 2, wherein the SNMP V3 server obtaining the multi-byte original password of a user comprises:

obtaining, by the SNMP V3 server, the multi-byte original password of the user through a configuration management interface, wherein the original password is configured in the SNMP V3 server.

10. The SNMP V3 server according to claim 6, wherein the password acquiring module acquires the original password of the user through a configuration management interface; and the original password of the user is configured in the SNMP V3 server.

* * * * *